United States Patent
Yamada

(10) Patent No.: US 10,875,350 B2
(45) Date of Patent: Dec. 29, 2020

(54) ANTI-COUNTERFEITING STRUCTURE

(71) Applicant: TOPPAN PRINTING CO., LTD., Tokyo (JP)

(72) Inventor: Shizuka Yamada, Tokyo (JP)

(73) Assignee: TOPPAN PRINTING CO., LTD., Tokyo (JP)

( * ) Notice: Subject to any disclaimer, the term of this patent is extended or adjusted under 35 U.S.C. 154(b) by 0 days.

(21) Appl. No.: 16/195,213

(22) Filed: Nov. 19, 2018

(65) Prior Publication Data

US 2019/0084338 A1 Mar. 21, 2019

Related U.S. Application Data

(63) Continuation of application No. PCT/JP2017/018608, filed on May 18, 2017.

(30) Foreign Application Priority Data

May 20, 2016 (JP) .................. 2016-101570

(51) Int. Cl.
*B42D 25/435* (2014.01)
*B42D 25/36* (2014.01)
(Continued)

(52) U.S. Cl.
CPC .............. *B42D 25/36* (2014.10); *B41M 3/14* (2013.01); *B41M 5/46* (2013.01); *B42D 25/328* (2014.10);
(Continued)

(58) Field of Classification Search
CPC ................................................... B42D 25/435
See application file for complete search history.

(56) References Cited

U.S. PATENT DOCUMENTS 4,544,181 A * 10/1985 Maurer .................. B42D 25/45
  283/74
6,082,778 A * 7/2000 Solmsdorf ........... G03H 1/0256
  283/107
(Continued)

FOREIGN PATENT DOCUMENTS

JP 2001-096959 A 4/2001
JP 2002-032724 A 1/2002
(Continued)

OTHER PUBLICATIONS

International Search Report regarding PCT/JP2017/018608, dated Aug. 1, 2017, 1 page.
Extended European Search Report dated Oct. 28, 2019 for corresponding Application No. 17799454.8 (6 pages).

*Primary Examiner* — Kyle R Grabowski
(74) *Attorney, Agent, or Firm* — Foley & Lardner LLP

(57) ABSTRACT

An anti-counterfeiting structure includes a substrate having a surface, and an device structure positioned on the surface. A side opposite to the side on which the substrate is positioned with respect to the device structure is an observation side, and the device structure comprises an optical device layer that emits predetermined light towards the observation side, and an information portion that contains given information. The information portion comprises a first substance having optical transparency, wherein the first substance is changeable to a second substance having a different optical characteristic from the first substance by laser irradiation, and the second substance representing information. The device structure has a display surface that is a surface opposite to the surface on which a surface of the substrate, and is configured so as to display information contained in the information portion via the display surface.

8 Claims, 7 Drawing Sheets

(51) Int. Cl.
- *B41M 5/46* (2006.01)
- *B42D 25/328* (2014.01)
- *G02B 5/18* (2006.01)
- *B41M 3/14* (2006.01)
- *G02B 5/28* (2006.01)
- *B42D 25/23* (2014.01)
- *B42D 25/29* (2014.01)
- *B42D 25/324* (2014.01)
- *B42D 25/364* (2014.01)
- *B42D 25/373* (2014.01)
- *B42D 25/382* (2014.01)
- *B42D 25/387* (2014.01)
- *G03H 1/00* (2006.01)

(52) U.S. Cl.
CPC ............ *B42D 25/435* (2014.10); *G02B 5/18* (2013.01); *G02B 5/1861* (2013.01); *G02B 5/28* (2013.01); *B42D 25/23* (2014.10); *B42D 25/29* (2014.10); *B42D 25/324* (2014.10); *B42D 25/364* (2014.10); *B42D 25/373* (2014.10); *B42D 25/382* (2014.10); *B42D 25/387* (2014.10); *G03H 1/0011* (2013.01)

(56) References Cited

U.S. PATENT DOCUMENTS

| | | | |
|---|---|---|---|
| 8,400,673 B2* | 3/2013 | Depta | B42D 25/41 358/1.1 |
| 8,622,433 B2* | 1/2014 | Depta | B41M 3/14 283/72 |
| 2003/0234286 A1* | 12/2003 | Labrec | B41M 3/14 235/380 |
| 2006/0145468 A1* | 7/2006 | Plaschka | B41M 3/14 283/72 |
| 2008/0152402 A1* | 6/2008 | Tamemasa | G03G 15/2053 399/329 |
| 2008/0191462 A1 | 8/2008 | Depta et al. | |
| 2010/0181754 A1* | 7/2010 | Labrec | B41M 5/24 283/95 |
| 2013/0099473 A1* | 4/2013 | Harrison | B41M 3/14 283/85 |
| 2013/0344298 A1 | 12/2013 | Haas et al. | |

FOREIGN PATENT DOCUMENTS

| | | | |
|---|---|---|---|
| JP | 2013188966 A | * | 9/2013 |
| JP | 2016-101570 A | | 6/2016 |
| WO | WO-2005/108109 A | | 11/2005 |

* cited by examiner

ANTI-COUNTERFEITING STRUCTURE

CROSS-REFERENCE TO RELATED PATENT APPLICATIONS

This application is a continuation application filed under 35 U.S.C. § 111(a) claiming the benefit under 35 U.S.C. §§ 120 and 365(c) of International Patent Application No. PCT/JP2017/018608, filed on May 18, 2017, which is based upon and claims the benefit of priority to Japanese Patent Application No. 2016-101570, filed on May 20, 2016, the disclosures of which are all hereby incorporated herein by reference in their entireties.

TECHNICAL FIELD

The present invention relates to an anti-counterfeiting structure.

BACKGROUND ART

An information authentication medium such as a passport or an identification (ID) card contains information such as a facial image of an individual to be authenticated in order to enable visual authentication of the individual by use of the information authentication medium. The information authentication medium before information is added has a substrate, and a method for adding information to the information authentication medium, includes, for example, a method for adding information to the substrate by laser-irradiating the substrate of the information authentication medium (refer, for example, to Patent Literature 1).

Moreover, in the information authentication medium, an optical variable device (OVD) is attached to the substrate for the purpose of preventing the information authentication medium from being counterfeited. The OVD is, for example, a hologram, a diffraction grating, and a multilayer film, and the multilayer film is configured so that light emitted from each film interferes with light emitted from the other remaining films. In the information authentication medium, such authenticity decision of the optical variable device is used as one means for deciding the authenticity of the information authentication medium.

CITATION LIST

[Patent Literature] [PTL 1] JP 2006-123174 A

SUMMARY OF THE INVENTION

Technical Problem

Incidentally, in the information authentication medium, there are cases where each information authentication medium may be counterfeited by peeling off an OVD from a substrate of a genuine information authentication medium and attaching the peeled off OVD to a substrate containing fraudulent information. Thereby, the information authentication medium is counterfeited such that fraudulent information combined with the OVD is used as if it is genuine information. Therefore, in such an information authentication medium, it is desired to deter counterfeiting of an information authentication medium having OVD and fraudulent information combined.

Further, deterrence of counterfeiting of an anti-counterfeiting structure such as an information authentication medium is commonly desired not only for an information authentication medium having an OVD, but also for an anti-counterfeiting structure having other optical devices other than an OVD attached for the purpose of deterring counterfeiting of an anti-counterfeiting structure, for example, an optical device that scatters light and that emits predetermined light toward an observation side.

It is an object of the present invention to provide an anti-counterfeiting structure which makes it difficult to counterfeit, by a combination of an optical device layer and information included in an anti-counterfeiting structure.

Solution to Problem

An anti-counterfeiting structure for solving the aforementioned problem comprises a substrate having a surface and an device structure positioned on the surface. A side opposite to the side on which the substrate 11 is positioned with respect to the device structure 12 is the observation side, and the device structure comprises an optical device layer that emits predetermined light towards the observation side, and an information portion that contains given information. The information portion comprises a first substance having optical transparency, wherein the first substance is changeable to a second substance having a different optical characteristic from the first substance by laser irradiation, and the second substance represents the information. The device structure is configured to have a display surface that is a surface opposite to the surface on which the surface of the substrate is positioned, and to display information contained in the information portion via the display surface.

According to the aforementioned configuration, it is difficult to separate the optical device layer from the information portion, as compared to a configuration where the device structure containing the optical device layer and the part containing information are separately positioned on the substrate. Therefore, it is difficult to add information different from genuine information held by the anti-counterfeiting structure to the device structure. Therefore, counterfeiting, by combining the optical device layer with the information containing the anti-counterfeiting structure, can be made difficult.

DESCRIPTION OF REPRESENTATIVE EMBODIMENTS

Figure 1:
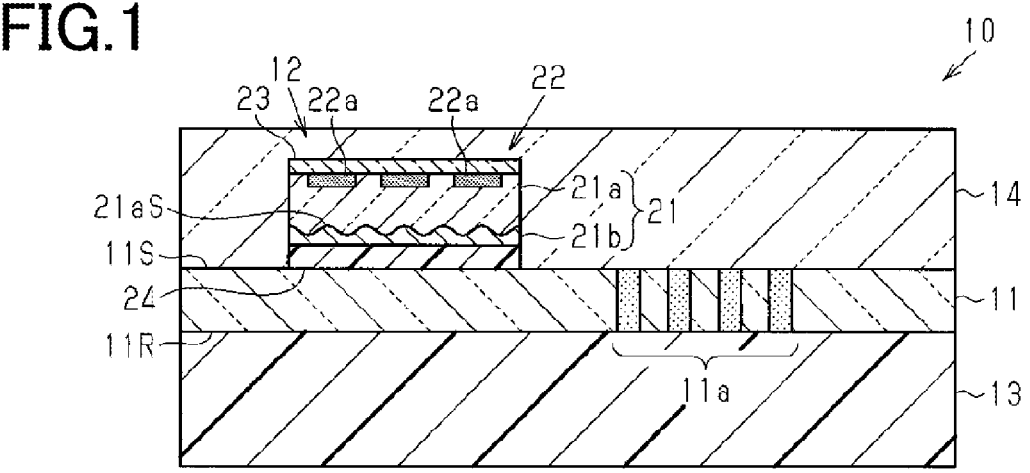
FIG. 1 is a cross-sectional view showing a cross-sectional structure of a first embodiment describing in detail of an anti-counterfeiting structure as a personal authentication medium.

With reference to the drawings, embodiments of the present invention will be described in detail. It is to be understood that the present invention is not limited to the following embodiments, which are intended to be representative of the present invention. The representative embodiments described below are merely examples of the present invention, and the design thereof could be appropriately changed by one skilled in the art. Incidentally, unless there is a reason for the sake of convenience, the same reference signs will be used for identical components, and redundant explanations will be omitted. It will be noted that in the drawings, like or corresponding parts are designated by like reference numerals and redundant illustrations therefor are omitted. The dimensional ratios in the drawings should not be construed as limited to those ratios shown therein.

First Embodiment

Referring to FIGS. 1 to 11, a first embodiment will be described in detail of an anti-counterfeiting structure as a personal authentication medium. Hereinafter, a configuration of the personal authentication medium, a method of producing the personal authentication medium, a function of the personal authentication medium, and a detailed configuration relating to the personal authentication medium will be described in sequence.

[Configuration of Personal Authentication Medium]

Figure 2:
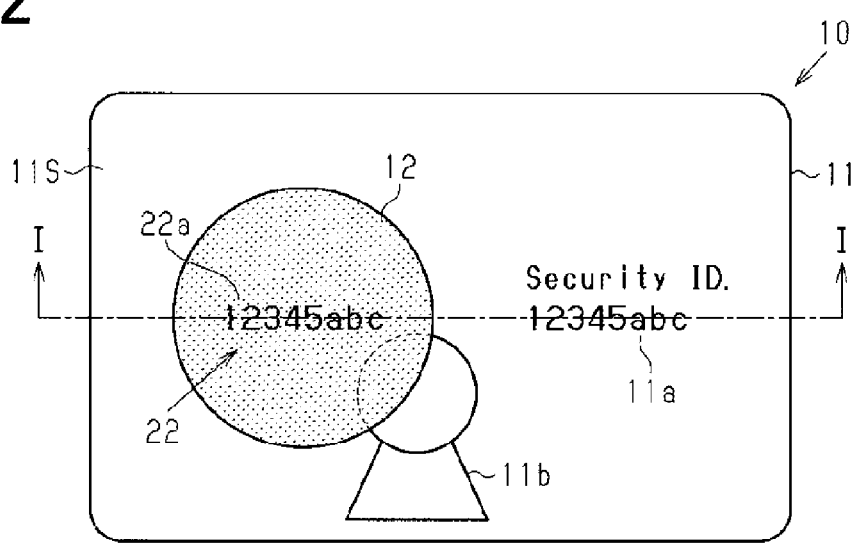
FIG. 2 is a plan view showing a planar structure of the personal authentication medium.

Referring to FIGS. 1 and 2, the configuration of the personal authentication medium will be described.

As shown in FIG. 1, a personal authentication medium 10 comprises a substrate 11 and an device structure 12. The substrate 11 comprises a surface 11S, and the device structure 12 is positioned on the surface 11S. The device structure 12, as viewed perpendicular to the surface 11S, has a size to cover a portion of the surface 11S, but it may have a size to cover the entire surface front 11S. A side opposite to the side on which the substrate 11 is positioned with respect to the device structure 12 is the observation side.

The device structure 12 comprises an optical device layer 21 that emits predetermined light towards the observation side, and an information portion 22 that contains given information.

The information portion 22 comprises a first substance and a second substance. The first substance has a first optical characteristic that is colorless or colored, and has optical transparency. The first substance changes from the first substance into the second substance having an optical characteristic different from that of the first substance by laser irradiation, and the second substance has a second optical characteristic that is colorless or colored. The second substance is an element that represents information. As viewed perpendicular to the surface 11S, a portion that overlaps with at least the information portion 22 in a part opposite to the part on which the substrate 11 is positioned with respect to the information portion 22 in the device structure 12 has optical transparency. Namely, the device structure 12 is configured such that information contained in the information portion 22 is displayed via a display surface that is a surface opposite to the surface on which the surface 11S of the substrate 11 is positioned in the device structure 12.

According to such personal authentication medium 10 as such, it is difficult to separate the optical device layer 21 from the information portion 22, as compared to a configuration where the device structure containing the optical device layer and the part containing information are separately positioned on the substrate. Therefore, it is difficult to add information different from the information that an authentic personal authentication medium 10 has to the device structure 12. Therefore, it is possible to make counterfeiting difficult by combining the optical device layer 21 with the information held by the personal authentication medium 10.

More specifically, the device structure 12 further comprises a peeling layer 23 and an adhesive layer 24, and in the device structure 12, the peeling layer 23, the information portion 22, the optical device layer 21, and the adhesive layer 24 are stacked from the observation side in this order. The peeling layer 23 has a display surface described above which is a surface opposite to the surface on which the information portion 22 is positioned. A portion of the optical device layer 21 is positioned at the same position as the information portion 22 in the thickness direction of the device structure 12.

The adhesive layer 24 has a function of adhering layers other than the adhesive layer 24 constituting the device structure 12 and the substrate 11. The adhesive strength between the adhesive layer 24 and the substrate 11 is lower than the adhesive strength between the layers constituting the device structure 12.

Information contained in the information portion 22 is first element information that is an example of the first information. The information portion 22 is composed of a plurality of information elements 22a, and each information element 22a is positioned apart from all the other information elements 22a on the surface where the information portion 22 in the peeling layer 23 is positioned.

Each information element 22a comprises a first substance and a second substance. In each information element 22a, the first substance is dispersed substantially throughout the entire information element 22a, and the second substance is also dispersed substantially throughout the entire information element 22a. The first substance absorbs laser light applied to the information element 22a, thereby modifying the first substance into the second substance. The first substance is colorless and has optical transparency, and the second substance has a designated color, for example, black. Alternatively, the first substance may be colored and have optical transparency, and the second substance may be colorless.

Further, the first substance may be colorless or colored and have fluorescence properties, and the second substance may also be colorless or colored and have fluorescence properties. Such a configuration may be, for example, a configuration where the first substance emits visible fluorescence by being excited by ultraviolet light or infrared light, and the second substance emits visible fluorescence that is weaker than the first substance by being excited by ultraviolet light or infrared light. The first substance may contain a fluorescent dye. An organic dye may be used as the fluorescent dye. As an organic dye used as the fluorescent dye, a cyanine dye, coumarin dye, rhodamine dye or the like can be used. A metal complex may be used as a material having fluorescence properties. An organometallic complex having a chelate ligand can be used as the metal complex. A metal contained in the organometallic complex includes Al, Mg, and Zn.

The optical device layer 21 is, for example, a relief diffraction grating layer, and comprises a relief structure layer 21a and a reflecting layer 21b. The relief structure layer 21a is a layer contacting the information portion 22, and fills spaces between a plurality of information portions 22. The relief structure layer 21a has a relief surface 21aS that functions as a diffraction grating on the surface opposite to the surface on which the information portion 22 is in contact. The relief structure layer 21a has optical transparency. The reflecting layer 21b covers the relief surface 21aS of the relief structure layer 21a, and has a function of enhancing the reflection efficiency of light in the relief surface 21aS.

The peeling layer 23 is a layer having optical transparency, and is a part opposite to the part on which the substrate 11 is positioned with respect to the optical device layer 21 in the device structure 12. Therefore, in the personal authentication medium 10, a part excluding a part constituted by the second substance in a part in the device structure 12 opposite to the part on which the substrate 11 is positioned with respect to the information portion 22 has optical transparency.

The substrate 11 comprises a third substance and a fourth substance, and the third substance has optical transparency, and being changeable from the third substance to the fourth substance having a designated color by laser irradiation. The fourth substance is an element representing first substrate information which is an example of second information. The substrate 11 comprises a first substrate information portion 11a containing first substrate information, and the first substrate information portion 11a comprises the third substance and the fourth substance. In the first substrate information portion 11a, each of the third substance and the fourth substance is dispersed substantially throughout the entire first substrate information portion 11a. A portion other than the first substrate information portion 11a in the substrate 11 is composed of the third substance and has optical transparency. In the substrate 11, a surface opposite to the surface of the surface 11S is a rear surface 11R.

The personal authentication medium 10 further comprises a support substrate 13 and a coating layer 14. The support substrate 13 has a function of mechanically supporting the substrate 11 by contacting the rear surface 11R of the substrate 11. The support substrate 13 may have optical transparency or may not have optical transparency.

The coating layer 14 covers a portion not covered by the device structure 12, and the device structure 12, in the surface 11S of the substrate 11. The coating layer 14 has optical transparency. The adhesive strength between the coating layer 14 and the device structure 12 is lower than the adhesive strength between the layers constituting the device structure 12.

Therefore, when light enters the personal authentication medium 10 from the observation side of the personal authentication medium 10, the light entering the personal authentication medium 10 is transmitted through the coating layer 14 and the peeling layer 23 and enters the optical device layer 21. Light entering the optical device layer 21 is reflected by the relief surface 21aS of the relief structure layer 21a, and is emitted as diffracted light from the optical device layer 21. The diffracted light emitted from the optical device layer 21 is transmitted through the peeling layer 23 and the coating layer 14 and is emitted to the outside of the personal authentication medium 10.

FIG. 2 shows a planar structure of the personal authentication medium 10 as viewed perpendicular to the surface 11S of the substrate 11. Further, in FIG. 2, for the purpose of convenience for illustration, illustration of the coating layer 14 and illustration of the peeling layer 23 in the personal authentication medium 10 are simplified. Moreover, for the purpose of convenience for showing diffracted light emitted from the device structure 12 schematically, dots are added to the device structure 12. Further, FIG. 1 referred to previously shows a cross-sectional structure taken along the line I-I in FIG. 2.

As shown in FIG. 2, each information element 22a constituting the information portion 22 has a shape representing a portion of the first element information as viewed perpendicular to the surface 11S.

In such a configuration, information contained in the information portion 22 is represented by the shape of each information element 22a constituting the information portion 22, and the second substance contained in each information element 22a, and therefore the shape of the information becomes clearer compared to that of the configuration where information is represented only by the second substance.

The information contained in the information portion 22 is, for example, an ID associated with an individual who is authenticated by the personal authentication medium 10. The ID is "12345abc", and is composed of alphabetic characters which are examples of letters and numbers. Each information element 22a is a portion of information, and has a shape representing one alphabetic character or a shape representing one number.

More specifically, the information portion 22 is composed of 8 information elements 22a, and of the aforementioned "12345abc", each of these information elements 22a has a shape representing information different from that represented by all the other information elements 22a.

The first substrate information contained in the first substrate information portion 11a is associated with the first element information contained in the information portion 22, and constitutes an information group specific to the personal authentication medium 10 together with the first element information.

In this way, one personal authentication medium 10 contains a specific information group composed of the first element information and the first substrate information, and therefore, in the personal authentication medium 10, for example, when the first element information is falsified, it is determined that the first element information has been falsified by the discrepancy between the first element information and the first substrate information. In other words, it is difficult to falsify information contained in the personal authentication medium 10 without being found the fact of falsification.

The first substrate information contained in the first substrate information portion 11a is an example of information associated with the first element information contained in the information portion 22, and contains "12345abc" which is the same information as that of the first element information, and "Security ID." which is information not contained in the first element information.

Here, a plurality of elements associated with one another constitute one category, and the first element information and the first substrate information represent, with an identical representation, one of the plurality of elements that belong to one category.

Examples of the category may be a country name, an individual, a region and an ID. When the category is a country name, the category includes, for example, Japan, the United States, and China, as the plurality of elements. When the category is an individual, the category includes a plurality of different individuals, as the plurality of elements. When the category is a region, the category includes, for example, Asia, Europe, North America, South America, Africa and the like. When the category is an ID, the category includes, for example, a plurality of combinations of letters and numbers such as alphabetic characters, as the plurality of elements.

As described above, in the personal authentication medium 10, the category including the first element information and the first substrate information is an ID, and the first element information and the first substrate information represent a single element "12345abc" of the ID with an identical representation.

In this way, the first element information and the first substrate information represent a single element belonging to one category with an identical representation with each other, and therefore when the first element information or the first substrate information is falsified, it is possible to determine that the personal authentication medium 10 has been falsified due to a discrepancy between information determined only from the first element information and from the first substrate information.

The substrate 11 comprises a second substrate information portion 11b containing second substrate information. The second substrate information portion 11b is positioned at a different position from the position where the first substrate information portion 11a is positioned in the substrate 11 as viewed perpendicular to the surface 11S. A portion of the second substrate information portion 11b overlaps with the device structure 12 as viewed perpendicular to the surface 11S.

The second substrate information portion 11b contains an upper body image of an individual authenticated by the personal authentication medium 10 as the second substrate information. Further, the second substrate information may be an image associated with an individual or may be character information associated with an individual. Moreover, the second substrate information may not be information associated with an individual, but may be mutually equivalent information in a plurality of personal authentication medium.

[Method of Producing Personal Authentication Medium]

Referring to FIGS. 3 to 10, a method of producing a personal authentication medium will be described.

Figure 3:
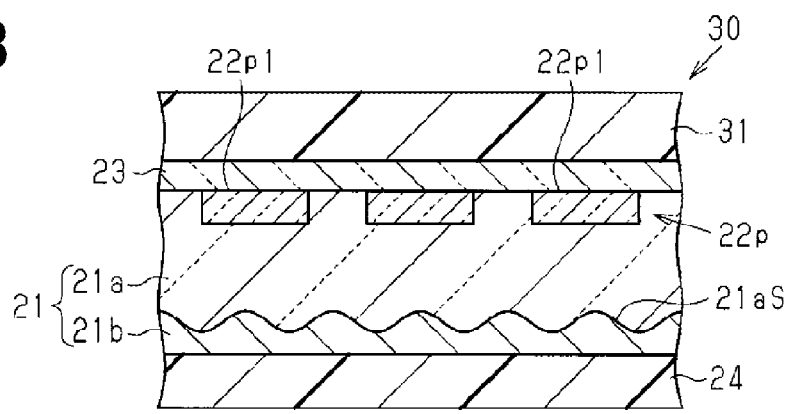
FIG. 3 is a partial cross-sectional view showing a partial cross-sectional structure of a transfer foil used in the production of the personal authentication medium.

As shown in FIG. 3, when producing the personal authentication medium 10, first, a transfer foil 30 for forming the device structure 12 is prepared. The transfer foil 30 comprises a support layer 31, a peeling layer 23, an information precursor portion 22p, an optical device layer 21, and an adhesive layer 24.

When producing the transfer foil 30, firstly, the support layer 31 is prepared, and the peeling layer 23 is formed on a surface of the support layer 31. The peeling layer 23 is a layer made of resin. Further, a plurality of precursor elements 22p1 are formed on the surface opposite to the surface on which the support layer 31 in the peeling layer 23 is in contact, and thereby the information precursor portion 22p is formed.

The information precursor portion 22p is made of resin like the peeling layer 23, and is formed by applying a coating liquid containing the first substance which is a material for forming the information precursor portion 22p on the surface opposite to the surface on which the support layer 31 in the peeling layer 23 is in contact. Therefore, a portion of the coating liquid for forming the information precursor portion 22p soaks into the peeling layer 23 from the surface contacting the information precursor portion 22p in the peeling layer 23.

Figure 4:
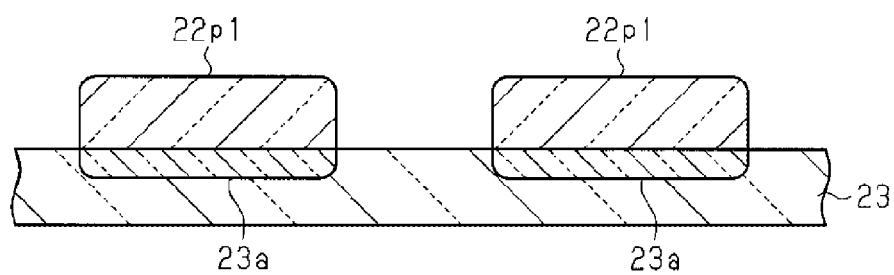
FIG. 4 is a partial enlarged cross-sectional view showing an enlarged partial cross-sectional structure of the transfer foil.

Thereby, as shown in FIG. 4, a plurality of precursor elements 22p1 positioned on one surface of the peeling layer 23 are formed, and a dispersion portion 23a which is a part where the first substance is dispersed is formed in the inside of the peeling layer 23. Each precursor element 22p1 overlaps with a dispersion portion 23a which is different from the dispersion portion 23a where other precursor elements 22p1 overlap as seen from the direction facing the surface where the information portion 22 is positioned in the peeling layer 23.

Next, a precursor layer of the relief structure layer 21a is formed in the peeling layer 23 on the surface where the information precursor portion 22p is positioned, such that the entire information precursor portion 22p is covered, and gaps between precursor elements 22p1 adjacent to one another are filled. The precursor layer preferably has a degree of thickness such that the surface opposite to the surface on which the peeling layer 23 is in contact is substantially flat, and the formation of the relief structure with respect to the precursor layer is not affected by the information precursor portion 22p.

Further, an intermediate layer having a thickness that fills the gaps between precursor elements 22p1 adjacent to one another may be formed prior to forming the precursor layer. Thereby, the thickness of the precursor layer can be reduced by an amount corresponding to the formation of the intermediate layer.

A relief structure layer 21a is obtained by processing the surface opposite to the surface on which the peeling layer 23 is in contact to a relief surface in the precursor layer. Further, a reflecting layer 21b is formed on the relief surface 21aS of the relief structure layer 21a, and the adhesive layer 24 is formed on the surface opposite to the surface on which the relief structure layer 21a on the reflecting layer 21b is in contact.

Figure 5:
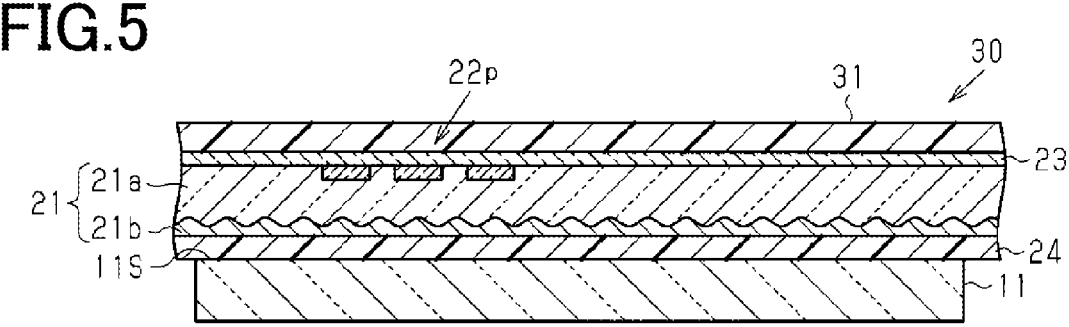
FIG. 5 is a process diagram showing a process of attaching the transfer foil to a substrate in a method of producing the personal authentication medium.

As shown in FIG. 5, the substrate 11 which is a transferred object is prepared, and the adhesive layer 24 of the transfer foil 30 is brought into contact with the surface 11S of the substrate 11, thereby transferring the transfer foil 30 to the substrate 11. The transfer foil 30 may be spot-transferred to the substrate 11 using an up-down method or may be stripe-transferred to the substrate 11 using a roll transfer method.

When the transfer foil 30 is transferred to the substrate 11 using the up-down method, the transfer foil 30 is overlapped on the surface 11S of the substrate 11 in a state where the adhesive layer 24 of the transfer foil 30 faces the substrate 11. Further, a heated hot stamp is pressed against the support layer 31 of the transfer foil 30. Thereby, a portion overlapped with the hot stamp is softened, and the softened portion is adhered to the substrate 11 as viewed perpendicular to the surface 11S in the adhesive layer 24.

Figure 6:
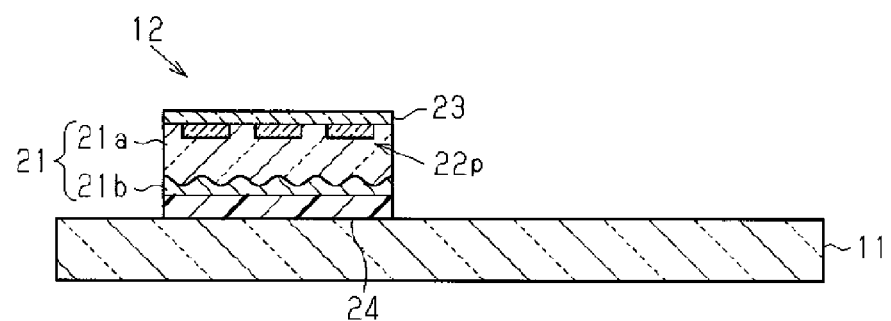
FIG. 6 is a process diagram showing a process of removing a support layer of the transfer foil in the method of producing the personal authentication medium.

As shown in FIG. 6, a relative position of the transfer foil 30 with respect to the substrate 11 is changed from a relative position when a portion of the transfer foil 30 was adhered. Thereby, as viewed perpendicular to the surface 11S, on the peeling layer 23, a portion overlapped with the portion adhered to the substrate 11 in the adhesive layer 24 is peeled off from the support layer 31, and as a result, a portion of the transfer foil 30 is transferred to the substrate 11. Thus, the substrate 11 having the device structure 12 can be obtained.

Figure 7:
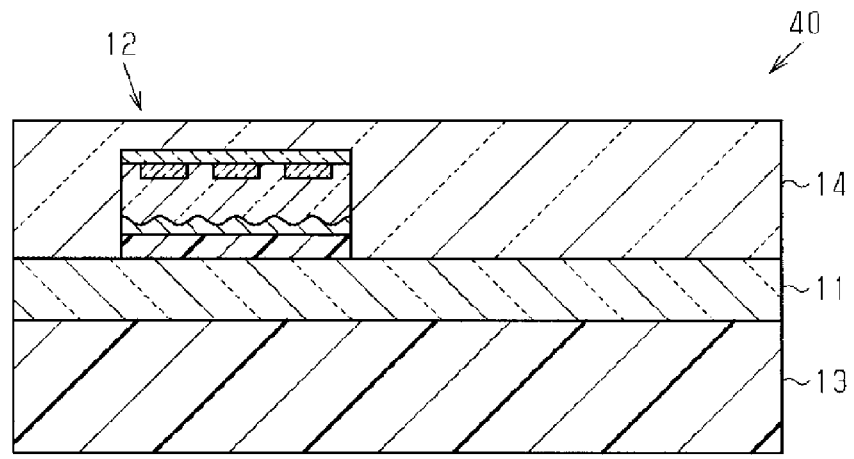
FIG. 7 is a process diagram showing a process of laminating a coating layer and a support substrate to a substrate in the method of producing the personal authentication medium.

As shown in FIG. 7, the support substrate 13 and the coating layer 14 are prepared, and in a state where the substrate 11 having the device structure 12 is placed between the support substrate 13 and the coating layer 14, the support substrate 13, the substrate 11, and the coating layer 14 are adhered to one another. Thereby, a laminate 40 composed of the support substrate 13, the substrate 11, the device structure 12, and the coating layer 14 can be obtained.

Figure 8:
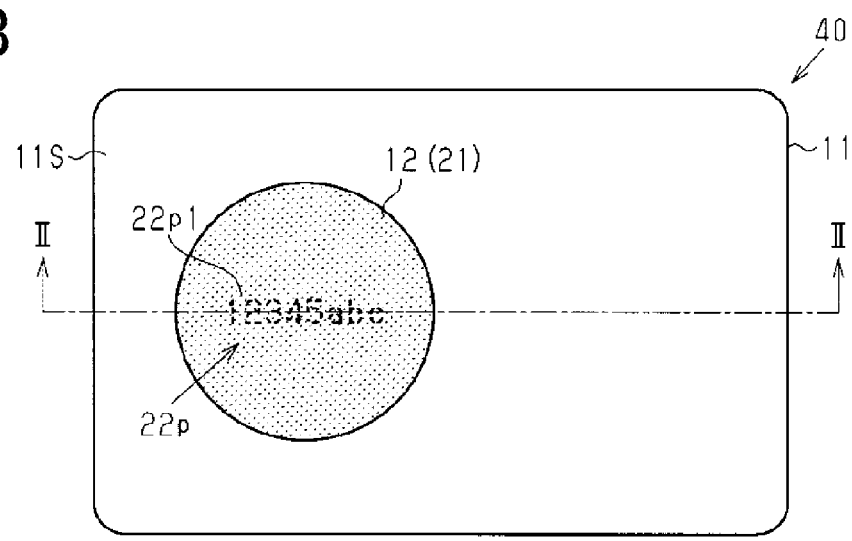
FIG. 8 is a plan view showing a planar structure of the laminate.

FIG. 8 shows a planar structure of the laminate 40 as seen from the direction facing the surface 11S of the substrate 11. In FIG. 8, as in FIG. 2, dots are added to the device structure 12 for convenience of showing schematically diffracted light emitted from the device structure 12. Further, FIG. 7 referred to previously shows a cross-sectional structure taken along the line II-II in FIG. 8.

As shown in FIG. 8, the device structure 12 is positioned on a portion of the surface 11S as viewed perpendicular to the surface 11S of the substrate 11. The information precursor portion 22p is positioned on a portion of the optical device layer 21 as viewed perpendicular to the surface 11S of the substrate 11. Each precursor element 22p1 constituting the information precursor portion 22p has a shape that represents a portion of the first element information as viewed perpendicular to the surface 11S of the substrate 11.

Further, in a configuration where the information precursor portion 22p is positioned on a portion of the surface 11S, it is possible to form a first substrate information portion 11a between the precursor elements 22p1 adjacent to one another in the substrate 11 by transmitting laser light LB through a region where the information precursor portion 22p is not positioned in the device structure 12 as viewed perpendicular to the surface 11S of the substrate 11.

Figure 9:
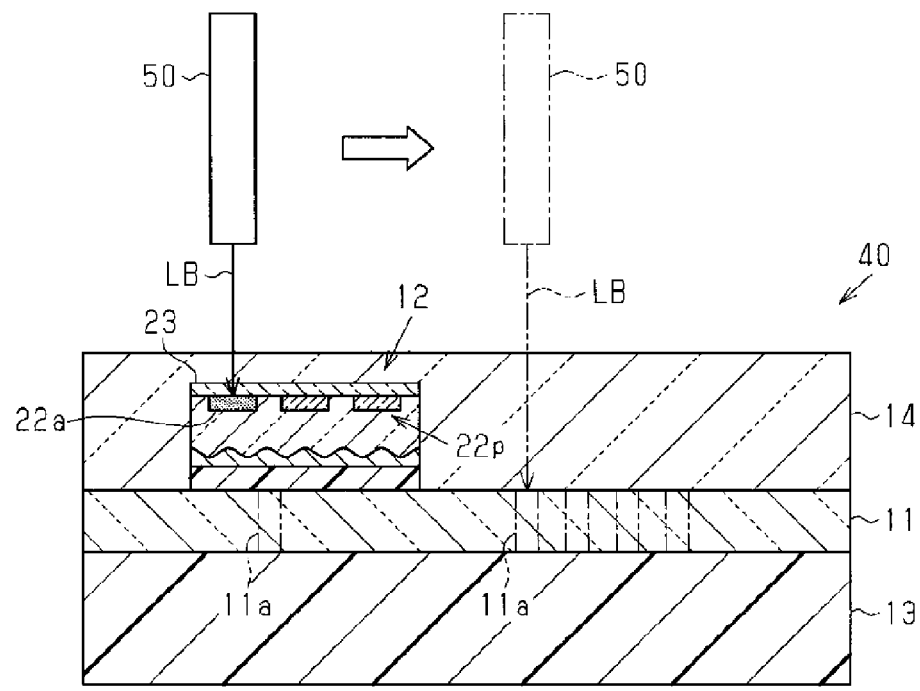
FIG. 9 is a process diagram showing a process of laser irradiation in the method of producing the personal authentication medium.

As shown in FIG. 9, the information precursor portion 22p of the device structure 12 and a portion of the substrate 11 in the laminate 40 are irradiated with the laser light LB using a laser 50. When irradiating the information precursor portion 22p with the laser light LB, an entire region containing a plurality of precursor elements 22p1 is irradiated with the laser light LB. Thereby, it is possible to irradiate the entirety of each precursor element 22p1 with the laser light LB, as compared to the case of irradiating each precursor element 22p1 individually with the laser light LB conforming to the shape of each precursor element 22p1.

By irradiating the precursor element 22p1 with the laser light LB, given information is recorded as the information element 22a. Moreover, as described above, the first substrate information portion 11a may be formed in a region where the information element 22a is not positioned in the substrate 11 as viewed perpendicular to the surface 11S of the substrate 11. In this case, the personal authentication medium 10 described previously by referring to FIGS. 1 and 2 has the first substrate information portion 11a in a region where the device structure 12 is positioned in the substrate 11.

Figure 10:
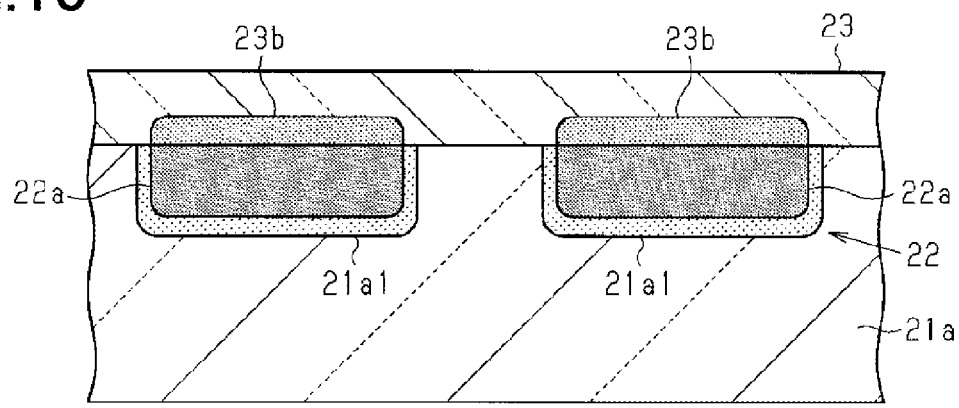
FIG. 10 is a partial enlarged cross-sectional view showing a partial enlarged cross-sectional structure of the personal authentication medium.

As shown in FIG. 10, when each precursor element 22p1 is irradiated with the laser light LB, a portion of the first substance contained in the precursor element 22p1 is alternated to the second substance, thereby, the information element 22a is formed from the precursor element 22p1. Moreover, when each precursor element 22p1 is irradiated with the laser light LB, the dispersion portion 23a of the peeling layer 23 is also irradiated with the laser light LB. Since the dispersion portion 23a also contains the first substance, a portion of the first substance contained in the dispersion portion 23a is converted into the second substance, and thus the alternated portion 23b has the black color.

Further, in a portion of the relief structure layer 21a contacting the information element 22a, a material of the relief structure layer 21a is also alternated more or less by the reaction where the first substance is alternated to the second substance in the information element 22a. Therefore, in the portion of the relief structure layer 21a contacting each information element 22a, a discolored alternated portion 21a1, that is, a portion having a color different from that of a portion other than the alternated portion 21a1 in the relief structure layer 21a is formed.

For example, even if it is possible to peel off the information element 22a from the relief structure layer 21a and illegally add an information element to the relief structure layer 21a based on the relief structure layer 21a having the alternated portion 21a1, the alternated portion 21a1 that is inseparable from the relief structure layer 21a remains in the relief structure layer 21a. Therefore, it is possible to detect that the personal authentication medium 10 has been falsified by the absence of the information element 22a corresponding to the alternated portion 21a1, or by a discrepancy between the alternated portion 21a1 and the information element illegally added to the relief structure layer 21a.

When the substrate 11 is irradiated with the laser light LB, the first substrate information portion 11a containing the fourth substance is formed in a portion irradiated with the laser light LB in the substrate 11. Further, the second substrate information portion 11b is formed by irradiating a position different from the position where the first substrate information portion 11a is formed in the substrate 11 with the laser light LB.

[Function of Personal Authentication Medium]

Figure 11:
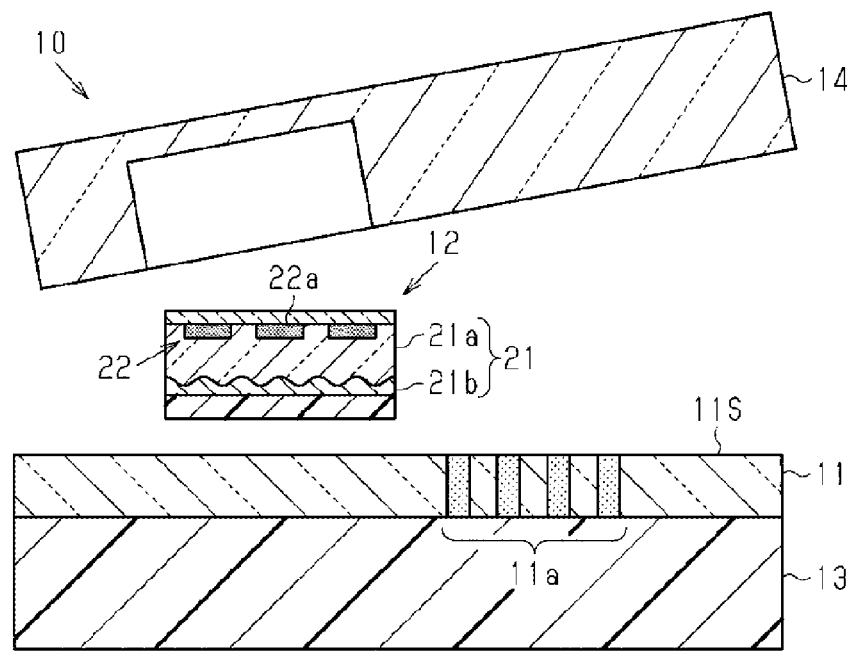
FIG. 11 is an operational view for describing an operation of the personal authentication medium.

With reference to FIG. 11, the function of the personal authentication medium 10 will be described.

As shown in FIG. 11, to counterfeit the personal authentication medium 10, a counterfeiter peels off the coating layer 14 from the surface 11S of the substrate 11 and takes out the device structure 12 from the inside of the personal authentication medium 10.

As described above, in addition to the optical device layer 21, the device structure 12 contains the information portion 22 containing the first element information that is difficult to separate from the optical device layer 21. As such, it is difficult to separate the information portion 22 from the optical device layer 21, as compared to the configuration where the information portion 22 containing the first element information is positioned at the substrate 11. Therefore, it is difficult to combine the optical device layer 21 with information different from the first element information, which is falsified information of the first element information, and as a result, it becomes difficult to counterfeit the personal authentication medium 10 by combining the optical device layer 21 with the first element information.

Moreover, even if the device structure 12 taken out is attached to a fraudulent substrate having falsified first substrate information, in the personal authentication medium 10, the first element information contained in the information portion 22 and the first substrate information contained in the substrate 11 form an information group specific to the personal authentication medium 10, and therefore falsification of information is easily detected by the discrepancy between the first element information and the first substrate information. As such, according to the personal authentication medium 10 mentioned above, it becomes difficult to counterfeit the personal authentication medium 10 by attaching the device structure 12 to a fraudulent substrate.

[Detailed Configuration Relating to Personal Authentication Medium]

A detailed configuration relating to the personal authentication medium 10, specifically, materials for forming each element constituting the personal authentication medium 10, the first element information and the first substrate information contained in the personal authentication medium 10, and types of the laser 50 will now be described in more detail.

[Support Layer]

The support layer 31 may have heat resistance against heat applied to the support layer 31 in forming the transfer foil 30, and mechanical strength capable of tolerating forces applied to the support layer 31 in forming the transfer foil 30.

Materials for forming the support layer 31 are, for example, synthetic resin, natural resin, paper, synthetic paper, and the like, and the support layer 31 may have a single-layer structure constituted by one of the layers formed from the respective materials, or it may have a multilayer structure constituted by two or more layers.

When the material that forms the support layer 31 is a synthetic resin, suitable formation materials include polyvinyl chloride, polyester, polycarbonate, polymethyl methacrylate, polystyrene, polyethylene, polyethylene terephthalate, polyethylene naphthalate, polypropylene, and polyvinyl alcohol.

The thickness of the support layer 31 is preferably 10 μm or more and 50 μm or less in terms of operability and processability of the support layer 31.

[Peeling Layer]

The peeling layer 23 may have optical transparency and to be able to tolerate heat and pressure applied to the peeling layer 23 when the transfer foil 30 is thermally transferred and heat and pressure applied to the peeling layer 23 when laminated on the device structure 12 transferred to the substrate 11. The peeling layer 23 is formed, for example, from a resin, and the material for forming the peeling layer 23 may be a thermoplastic resin, a thermosetting resin, an ultraviolet curable resin, an electron beam curable resin, or the like.

It is preferable to use a heat-resistant resin as a thermoplastic resin. When a material for forming the peeling layer 23 is a thermoplastic resin, the formation material includes, for example, a polycarbonate resin, a polyetherimide resin, a cyclic polyolefin copolymer, a modified norbornene resin, a polyamideimide resin, a polyimide resin, and a nitrocellulose resin and the like. The thickness of the peeling layer 23 may be 0.5 μm or more and 5 μm or less.

[Information Portion]

Materials for forming the information portion 22 include a near infrared light-absorbing dye and a curable resin. The near infrared light-absorbing dye and the curable resin prior to laser irradiation are examples of the first substance. The near infrared light-absorbing dye is a dye having an absorption characteristic in the near infrared region, in other words, in the range of 700 nm or more and 2,000 nm or less. Examples of the near infrared light-absorbing dye may be, a cyanine compound, a phthalocyanine compound, a dithiol metal complex, a naphthoquinone compound, a diimmonium compound, and an azo compound.

Further, the near infrared light-absorbing dye absorbs light having a certain wavelength and has a function of changing chemical bonds by absorbed light or a function of converting absorbed light into heat. By performing such a function, the near infrared light-absorbing dye can change the first substance forming the information portion 22 into the second substance, thereby providing a designated optical characteristic.

Incidentally, laser capable of emitting light that the near infrared light-absorbing dye can absorb and its oscillation wavelength are, for example, as below. That is, a GaAlAs semiconductor laser emits laser light having a wavelength of 635 nm or more and 840 nm or less, and a GaAs semiconductor laser emits laser light having a wavelength of 840 nm. An InP semiconductor laser emits laser light having a wavelength of 910 nm, and a YAG laser emits laser light having a wavelength of 1064 nm.

The curable resin may be, for example, a thermosetting resin, an ultraviolet curable resin, a charged particle beam curable resin, an electron beam curable resin, or the like. The curing resin may have optical transparency and solvent resistance. The curable resin may be, for example, polypropylene, polyethylene, polyamideimide, or the like. Further, the curable resin may be a phenol resin, a melamine resin, or the like, and the curable resin may be a resin other than these resins.

The first substance forming the information portion 22 has permeability capable of transmitting light emitted from the optical device layer 21 to such an extent that an observer of the personal authentication medium 10 can visually recognize the light. The permeability that allows the observer to visually recognize transmitted light may be, for example, a transmittance of 50% or more. The first substance is changed into the second substance by laser irradiation, and the second substance contains an alternated substance provided by modifying the near infrared light-absorbing dye by absorbing laser light, and a curable resin modified, for example carbonized, by heat generated by the near infrared light-absorbing dye. Among them, the near infrared light-absorbing dye and the modified curable resin have the aforementioned certain color.

Further, as a formation material containing such near infrared light-absorbing dye and a curable resin, for example, an ink for laser marking such as Elbima Z117 manufactured by TOYO INK SC HOLDINGS CO., LTD. can be used (Elbima is a registered trademark).

[Optical Device Layer]

The optical device contained in the optical device layer 21 is preferably an OVD, and the OVD is an optical device where an image reproduced by the OVD changes when the direction in which the OVD is visually recognized changes from one direction to another. The OVD is, for example, a hologram, a diffraction grating, a multilayer film, a liquid crystal layer, and a functional ink layer. As the liquid crystal layer, cholesteric liquid crystal can be used, and as the functional ink, a pearl pigment whose color changes depending on the observation angle may be used.

Of these, the hologram and the diffraction grating may each be of a relief type, which records an interference fringe of light as a fine relief pattern on a plane or of a volume type, which records the interference fringe in a thickness direction of the optical device 21.

Hereinafter, of these OVDs, a method of forming the optical device layer 21 in the case of using the relief diffraction grating and a method of forming the optical device layer 21 in the case of using a multilayer film shall be described in sequence. Further, a method of forming the relief hologram is the same as a method of forming the relief diffraction grating described below.

[Relief Diffraction Grating]

As mentioned above, the optical device layer 21 includes a relief surface 21aS having a fine relief pattern, in other words, a relief structure layer 21a having a relief surface, and a reflecting layer 21b covering the relief surface 21aS of the relief structure layer 21a.

When forming a relief diffraction grating, first, a master plate of the relief surface 21aS having a fine relief pattern is formed by an optical projection method, and a press plate made of nickel having a pattern where a relief pattern is duplicated using an electroplating method is formed.

Then, a coating film for forming the relief structure layer 21a is formed on the surface opposite to the surface on which the support layer 31 of the peeling layer 23 is in contact, and the relief structure layer 21a having the relief surface 21aS is formed by pressing the press plate against the coating film and curing the coating film after pressing of the press plate.

Next, on at least a portion of the relief surface 21aS of the relief structure layer 21a, a reflecting layer 21b for enhancing diffraction efficiency in the relief diffraction grating is formed.

The relief structure layer 21a may be any layer as long as it can form the relief surface 21aS by pressing a press plate thereon, and the material for forming the relief structure layer 21a may be, for example, an ultraviolet curable resin, an electron beam curable resin or the like. Material for forming the relief structure layer 21a may be, for example, epoxy (meth) acryl, urethane (meth) acrylate and the like. The relief structure layer 21a may have a single-layer structure constituted by only one of the layers formed by the respective forming resins described above or may have a multilayer structure constituted by two or more thereof.

Further, a material for forming the relief structure layer 21a is not limited to the aforementioned materials, and any material can be used as long as it has the relief surface 21aS, and it is capable of being configured such that an image reproduced by the optical device layer 21 changes when the direction in which the optical device layer 21 is visually recognized changes from one direction to another.

The relief structure layer 21a may be formed by using a photopolymer method. To form the relief structure layer 21a in the photopolymer method, the relief structure layer 21a may be formed of a monomer, an oligomer, or a polymer having an ethylenic unsaturated bond or an ethylenically unsaturated group.

Examples of the monomer include 1,6-hexanediol, neopentyl glycol diacrylate, trimethylolpropane triacrylate, pentaerythritol triacrylate, pentaerythritol tetraacrylate, dipentaerythritol pentaacrylate, and dipentaerythritol hexaacrylate. Examples of the oligomer include epoxy acrylate, urethane acrylate, and polyester acrylate. Examples of the polymer include a urethane-modified acrylic resin and an epoxy-modified acrylic resin.

The monomer, the oligomer, and the polymer having the ethylenically unsaturated bond or the ethylenically unsaturated group may be used in a mixture of two or more of the materials listed above. In addition, the monomers mentioned above and other monomers can be mutually crosslinked by imparting in advance a reactive group that undergoes a crosslinking reaction to the monomers mentioned above and other monomers, and by use of an isothiocyanate compound, a silane coupling agent, an organic titanate crosslinking agent, an organic zirconium crosslinking agent, or organic aluminate.

Further, the monomer, the oligomer, and the polymer having the ethylenically unsaturated bond or the ethylenically unsaturated group may be used in mixture with another resin. In this circumstance, the monomers mentioned above and other monomers can be crosslinked with a skeleton of another resin by imparting in advance a reactive group that undergoes a crosslinking reaction to the monomers mentioned above and other monomers, and by use of, for example, an isothiocyanate compound, a silane coupling agent, an organic titanate crosslinking agent, an organic zirconium crosslinking agent, or organic aluminate.

Such a method makes it possible to obtain the polymers having the ethylenically unsaturated bond or the ethylenically unsaturated group. These polymers provide high moldability of the relief surface 21aS and are less liable to stain the press block because they are solid at normal temperature and are less tacky.

When using photocationic polymerization for curing of the relief structure layer 21a, a formation material for the relief structure layer 21a may, for example, be a monomer, an oligomer, or a polymer having an epoxy group, an oxetane skeleton-containing compound, vinyl ether or the like.

During cure of the electron beam curable resin among the resins listed above by use of light such as ultraviolet light or others, a photoinitiator may be added to the electron beam curable resin. Examples of the photoinitiator include a photo radical polymerization initiator, a photocationic polymerization initiator, and a combination type of the photo radical polymerization initiator and the photocationic polymerization initiator, or a hybrid type, depending on which resin to which the photoinitiator is added. It is preferable to select a photoinitiator having a characteristic of absorbing light depending on the wavelength of light emitted from a light source used for curing of the electron beam curable resin as the photoinitiator.

Examples of the photo radical polymerization initiator include benzoin compounds, anthraquinone compounds, phenyl ketone compounds, benzil dimethyl ketal, thioxanthene, acylphosphine oxide, and Michler's ketone. Examples of the benzoin compound include benzoin, benzoin methyl ether, and benzoin ethyl ether. Examples of the anthraquinone compound include anthraquinone and methylanthraquinone. Examples of the phenyl ketone compound include acetophenone, diethoxyacetophenone, benzophenone, hydroxyacetophenone, 1-hydroxycyclohexyl phenyl ketone, α-aminoacetophenone, and 2-methyl-1-(4-methylthiophenyl)-2-morpholinopropane-1-one.

The photocationic polymerization initiator may be an aromatic diazonium salt, an aromatic iodonium salt, an aromatic sulfonium salt, an aromatic phosphonium salt, a mixed ligand metal salt, or the like.

The hybrid type photoinitiator may be a photoinitiator prepared by mixing a photo radical polymerization initiator and a photocationic polymerization initiator, or may be a photoinitiator that is capable of initiating both photoradical polymerization and photocationic polymerization. Examples of the photoinitiator capable of initiating both the photoradical polymerization and the photocationic polymerization include, for example, an aromatic iodonium salt and an aromatic sulfonium salt.

A blending amount of the photoinitiator to the electron beam curable resin may be determined according to the electron beam curable resin and the photoinitiator. The photoinitiator is preferably added at a ratio between 0.1% by mass or more and 15% by mass or less to the electron beam curable resin.

In addition, a sensitizing dye may be added to a mixture containing the electron beam curable resin and the photoinitiator. Still further, a dye, a pigment, various additives, a crosslinking agent, or the like may be added as necessary. In order to improve the moldability of the relief structure layer 21a, a resin nonreactive to the photopolymerization reaction may be added.

Examples of the various additive include a polymerization inhibitor, a leveling agent, a defoaming agent, an antifouling agent, an adhesion improving agent, a coating surface modifying agents, a plasticizer, and a nitrogen-containing compound. An exemplary crosslinking agent is an epoxy resin or the like. The nonreactive resin may be the thermoplastic resin or the thermosetting resin described above. Thickness of the relief structure layer 21a may be 1 µm or more and 25 µm or less.

The reflecting layer 21b is a portion configured to enhance diffraction efficiency of the relief surface 21aS of the relief structure layer 21a, and is formed of a material having a different refractive index from the resin forming the relief surface 21aS, that is, a polymer material. A high refractive index material or a metal material can be used as the material for forming the reflecting layer 21b. The high refractive index material may be, for example, $MgO_2$, $TiO_2$, $Si_2O_3$, SiO, $Fe_2O_3$, ZnS and the like. The metal material may be, for example, Al, Ag, Sn, Cr, Ni, Cu, Au, or the like. The reflecting layer 21b may have a single-layer structure constituted by only one of the layers formed by the respective forming materials listed above or may have a multilayer structure constituted by two or more thereof.

The reflecting layer 21b can be formed by a vacuum deposition method, a sputtering method or the like. Thickness of the reflecting layer 21b is set depending on the function required of the reflecting layer 21b, and is, for example, in the order of 50 Å or more and 10,000 Å or less.

The reflecting layer 21b may be formed on the entire relief surface 21aS of the relief structure layer 21a, but it may be formed on a portion of the relief surface 21aS. When the reflecting layer 21b is formed on a portion of the relief surface 21aS, for example, ink containing a water-soluble resin is printed on a portion of the relief surface 21aS where the reflecting layer 21b is not formed, and then a film for forming the reflecting layer 21b is formed on the entire relief surface 21aS. Then, by washing the water-soluble resin, the film formed in a portion overlapping with the water-soluble resin in the thickness direction of the optical device layer 21 of the film formed on the relief surface 21aS can be removed.

Moreover, for example, when the reflecting layer 21b is formed on a portion of the relief surface 21aS, a film for forming the reflecting layer 21b is formed on the entire relief surface 21aS, and a mask is formed on a portion where the reflecting layer 21b is formed in the relief surface 21aS which is a portion of the film. Further, a portion of the film for forming the reflecting layer 21b is dissolved and removed by exposing the film to an alkaline chemical or an acidic chemical that dissolves the film for forming the reflecting layer 21b. Further, as a method of removing a portion of the film for forming the reflecting layer 21b, for example, other methods such as a laser removal method may be used.

Thus, since the personal authentication medium 10 including the optical device layer 21 contains given information formed by the reflecting layer 21b by forming the reflecting layer 21b on a portion of the relief surface 21aS, a design of the personal authentication medium 10 can be enhanced.

When the adhesive layer 24 is formed of a material that is cured by irradiation with ultraviolet light or electron beam, and when the reflecting layer 21b is formed of a material that allows substantially no transmission of the ultraviolet light and the electron beam, forming the reflecting layer 21b on the portion of the relief surface 21aS can provide the following effects.

In other words, emitting ultraviolet light or an electron beam from the peeling layer 23 toward the adhesive layer 24 does not irradiate the part overlapping with the reflecting layer 21b as viewed perpendicular to the relief surface 21aS, but does irradiate the part not overlapping with the reflecting layer 21b.

Therefore, the portion of the adhesive layer 24 irradiated with the ultraviolet light or electron beam is cured, while the unirradiated portion is not cured. Therefore, when the device structure 12 is peeled off from the substrate 11, the cured portion of the adhesive layer 24 is difficult to peel off from the substrate 11, whereas the uncured portion thereof is easily peeled off from the substrate 11. As a result, when the device structure 12 is peeled from the substrate 11, a portion of the device structure 12 is likely to be broken by the force applied to the device structure 12. The thickness of the adhesive layer 24 may be 0.1 µm or more and 10 µm or less.

[Multilayer Film]

When the optical device layer 21 is a multilayer film formed from a plurality of thin films, and is a multilayer film that causes the optical device layer 21 to present a different image color in response to a change in the visual direction thereof, the optical device layer 21 is constituted as described below.

The optical device layer 21 is a multilayer film constituted by a plurality of layers each having a different optical characteristic. For example, a material with a refractive index over approximately 1.5 and below 2 is referred to as a low refractive index material, while a material with a refractive index of 2 or greater is referred to as a high refractive index material. A layer formed of a high refractive index material is referred to as a high refractive index layer, while a layer formed of a low refractive index material is referred to as a low refractive index layer.

When a multilayer film is of a configuration including a low refractive index layer and a high refractive index layer, it can be of a configuration having, for example, two or more high refractive index layers and one low refractive index layer. Materials for forming each layer of a multilayer film are, for example, materials shown in Table 1 below.

TABLE 1

| Material | Refractive Index (n) | Material | Refractive Index (n) |
|---|---|---|---|
| $Sb_2S_3$ | 3.0 | SiO | 2.0 |
| $Fe_2O_3$ | 2.7 | $Si_2O_3$ | 2.5 |
| $TiO_2$ | 2.6 | $In_2O_3$ | 2.0 |
| CdS | 2.6 | PbO | 2.6 |

TABLE 1-continued

| Material | Refractive Index (n) | Material | Refractive Index (n) |
|---|---|---|---|
| $CeO_2$ | 2.3 | $Ta_2O_3$ | 2.4 |
| ZnS | 2.3 | ZnO | 2.1 |
| $PbCL_2$ | 2.3 | $ZrO_2$ | 2.0 |
| CdO | 2.2 | $Cd_2O_3$ | 1.8 |
| $Sb_2O_3$ | 2.0 | $WO_3$ | 2.0 |

Note that, in addition to the materials shown in Table 1, layers constituting the multilayer film may be formed solely, for example, of Fe, Mg, Zn, Au, Ag, Cr, Ni, and Cu, and other metal. Alternatively, materials for forming each layer may be an alloy containing at least two of these metals, or may be a combination of Si and at least one element selected from the group of metals described above.

The layers constituting the multilayer film may be also formed of an organic polymer with a low refractive index. Examples of the organic polymer include polyethylene, polypropylene, polytetrafluoroethylene, polymethyl methacrylate, and polystyrene. Incidentally, the refractive indexes of these materials are: 1.51 for polyethylene, 1.49 for polypropylene, 1.35 for polytetrafluoroethylene, 1.49 for polymethyl methacrylate, and 1.60 for polystyrene. Layers formed of these organic polymers are low refractive index layers.

The multilayer film may have a configuration in which at least one layer with a predetermined thickness selected from the high refractive index layer described above and a metal layer with a light transmittance between 30% or more and 60% or less and at least one layer with a predetermined thickness selected from low refractive index layers are alternately stacked. A multilayer film with such a structure may be configured to have a characteristic of absorbing or reflecting visible light having a predeterminate wavelength.

Each layer of the multilayer film may be formed of a material selected from the aforementioned materials according to optical characteristics such as refractive index, reflectance, and transmittance, weather resistance, interlayer adhesiveness. etc.

Each layer of the multilayer film may be formed by a vacuum deposition method, a sputtering method, and other method. These methods can control a thickness, film formation rate, optical film thickness (optical film thickness=n× d, where n: refractive index, d: film thickness), etc.

Further, when the information portion 22 is positioned on the observation side with respect to the optical device layer 21, the optical device layer 21 may not have optical transparency.

[Adhesive Layer]

The adhesive layer 24 is a layer for fixing a structure composed of the support layer 31, the peeling layer 23, the information portion 22 and the optical device layer 21 to the substrate 11.

The adhesive layer 24 is preferably formed of a pressure sensitive material, that is, a resin that exhibits adhesion to the substrate 11 by application of pressure to the adhesive layer 24. Material for forming the adhesive layer 24 may be, for example, a thermoplastic resin such as a polyurethane resin, acrylic resin, vinyl chloride-vinyl acetate copolymer, epoxy resin, EVA or the like.

The adhesive layer 24 may be formed on the optical device layer 21 using, for example, a gravure coater, a micro gravure coater, a roll coater or the like.

Thereby, it is possible to obtain the transfer foil 30 used for producing the personal authentication medium 10.

[Substrate]

The substrate 11 may be configured so that color after laser irradiation changes to a different color from a color before the irradiation, namely, the substrate 11 may be configured so as being changeable from the third substance to the fourth substance by laser irradiation. Material for forming the substrate 11 may be any of an inorganic-based material, metallic material, organic-based material, and polymer material. The substrate 11 is preferably formed of a material having a characteristic of starting discoloration when it is laser-irradiated with a certain or higher level of intensity, that is, having a threshold of the intensity of the laser light when modifying the formation material.

The material for forming the substrate 11 may, for example, be a material capable of containing information by absorbing laser pulse energy and carbonizing or the like when the absorbed energy is equal to or higher than a certain energy level. Such materials are, for example, a material containing polycarbonate as a main component or a material containing polyester as a main component. Namely, these materials before carbonization are examples of the third substance, and these materials after carbonization are examples of the fourth substance.

The substrate 11 may be also formed, for example, of a mixture that is used for a black coloring layer or a color coloring layer, a mixture organized to develop color by virtue of laser irradiation. Among such mixtures, a mixture containing a thermoresponsive microcapsule is preferable in requiring a low level of energy for coloring the substrate 11, compared with a mixture containing no thermoresponsive microcapsules.

Moreover, the material for forming the substrate 11 may, for example, be a mixture containing a discolorable compound that discolors by laser irradiation and a photosensitive resin, which is a mixture configured to develop color by laser irradiation. The photosensitive resin is, for example, an ultraviolet curable resin, electron beam curable resin or the like. Preferably, such a mixture includes a promoting compound that promotes transubstantiation of the discolored compound by laser irradiation, or bonds the promoting compound to a skeleton of the photosensitive resin for convenience of control over a threshold of the irradiation amount of the laser light at which the mixture discolors.

The material for forming the base material 11 may be a synthetic resin having a characteristic of absorbing laser light with a certain wavelength, where the synthetic resin is changeable from the third substance to the fourth substance by laser irradiation. Alternatively, the material for forming the substrate 11 may be a combination of a synthetic resin and an inorganic that promotes transubstantiation of the synthetic resin. In this case, the synthetic resin may or may not have characteristics of being modified from the third substance to the fourth substance independently.

In addition, the substrate 11 may be formed, for example, of a mixture containing a transparent resin and at least one of a light-absorbent material and a thermo-sensitive coloring material.

In this way, if any of the aforementioned materials is used for the material for forming the substrate 11, a material prior to laser-irradiating the substrate 11, that is, a material changed by laser irradiation and having a designated color is the third substance, and the material after alternation is the fourth substance.

The substrate 11 may, for example, be a film formed by using a material for forming the substrate 11 described above. The substrate 11 may be formed by wet-coating a surface of another layer with a coating liquid produced by dissolving in a solution the material that forms the substrate 11 or a coating liquid dispersed in a liquid. Moreover, the substrate 11 may be also formed on one surface of another layer by a dry coating method such as a vacuum deposition or sputtering method. The thickness of the substrate 11 is preferably 50 μm or more and 400 μm or less.

[Support Substrate]

When the personal authentication medium 10 is a card, the material for forming the support substrate 13 is preferably polycarbonate (PC). The support substrate 13 is also preferably formed of polyethylene terephthalate (PET), thermoplastic polyester having amorphous, or noncrystalline, properties (PETG), polyvinyl chloride (PVC), an ABS resin, or others.

The support substrate 13 may have a single-layer structure constituted by one of the layers formed by the respective resins listed above or may have a multilayer structure constituted by two or more thereof. The thickness of the support substrate 13 is preferably 50 μm or more and 400 μm or less.

[Coating Layer]

The coating layer 14 may be configured to have permeability to laser light, and may have characteristics of absorbing, reflecting, or scattering a portion of laser light. In the coating layer 14, transmittance to light contained in the visible light region is preferably 60% or more and 100% or less, and more preferably 80% or more and 100% or less. The thickness of the coating layer 14 is preferably 50 μm or more and 400 μm or less.

Material for forming the coating layer 14 includes a resin having optical transparency. Examples of the suitable resins having optical transparency include polycarbonate (PC), plant-derived polycarbonate (bio PC), polyethylene terephthalate (PET), polysiloxane 1,4-dimethyl phthalate (PCT), polystyrene (PS), polymethyl methacrylate (PMMA), transparent acrylonitrile butadiene styrene copolymerized synthetic resin (MABS), polyvinyl chloride (PVC), polypropylene (PP), polyethylene (PE), and polyacetal.

[First Element Information and First Base Material Information]

The first element information and the first substrate information contained in the personal authentication medium 10 are not limited to the ID described above, and may be information other than this ID, i.e. other individual authentication information that can be used to authenticate an individual. The individual authentication information may contain at least one of biometric information and non-biometric information.

The biometric information is a characteristic unique to an individual, e.g., a characteristic authenticated among biometric features. The information is, for example, an image or pattern of a face, a fingerprint, and a vein pattern. The non-biometric information is individual information other than the biometric information, and includes, for example, name, date of birth, age, blood type, gender, nationality, address, permanent address, telephone number, department, title and the like. The non-biometric individual information may be letters formed by typing, a handwritten signature of the owner, or a combination thereof.

[Types of Lasers]

The laser 50 described above is a far-infrared laser including a $CO_2$ laser, a near-infrared pulse laser including an Nd:YAG laser and an Nd:YVO laser, a pulsed laser of visible light, an excimer laser, etc. Further, the laser 50 may also, for example, be an ultraviolet laser using a third harmonic of an Nd:YAG laser or an Nd:YVO laser, a semiconductor laser, a femtosecond laser, a picosecond laser and the like.

Among these lasers, a laser using the third harmonic either the Nd:YAG laser or the Nd:YVO laser is preferable in that it has high resolution and that the information portion 22 and the substrate 11 are highly absorbent to a laser light because the wavelength of the laser light is included in the ultraviolet range.

In addition, an ultrashort pulse laser such as a femtosecond laser and a picosecond laser can cut molecular bonds constituting the information portion 22 and the substrate 11 in a state in which the laser-irradiated information portion 22 and the substrate 11 remain cool. Therefore, information can be included to the information portion 22 and the substrate 11 with substantially no heat applied to the information portion 22 and the substrate 11.

Compared with other lasers, in addition, YAG lasers and semiconductor lasers are preferable in being capable of serving as a small device that emits a large amount of thermal energy, and in being capable of including information on the information portion 22 and the substrate 11 on demand.

As described above, the first embodiment of the anti-counterfeiting structure can achieve the following effects.

(1) Since it is difficult to separate the optical device layer 21 from the information portion 22, it is difficult to add information different from the information that the genuine personal authentication medium 10 has to the device structure 12. Therefore, it is possible to make counterfeiting difficult by combining the optical device layer 21 with the information held by the personal authentication medium 10.

(2) Since the first element information contained in the information portion 22 is represented by the shape of each information element 22a constituting the information portion 22 and by the second substance contained in each information element 22a, the shape of the first element information becomes clearer as compared to that of the configuration where information is represented only by the second substance.

(3) Since one personal authentication medium 10 contains a group of information specific to the personal authentication medium 10, then when, for example, the first element information is falsified with in the personal authentication medium 10, it is possible to determine that the first element information has been falsified by the discrepancy between the first element information and the first substrate information. In other words, it is difficult to falsify information contained in the personal authentication medium 10 so that it is not discovered that the information in the personal authentication medium 10 is falsified.

[Modification of the First Embodiment]

The first embodiment described above may be appropriately modified as below.

In the first element information and the first substrate information, a single element contained in one category may be indicated by representations different from each other. Even in such configuration, since the first element information and the first substrate information can constitute a mutually associated information group, it is possible to obtain a similar effect as that described above in (3).

For example, in the personal authentication medium 10, when the category contained in the first element information and the first substrate information is a country name, the first element information and the first substrate information may represent "Japan", which is a single element of the country name, in representations different from each other. Namely, the first element information may indicate a string of characters, and represents "JAPAN" which is an English notation for "Japan", and the first substrate information may indicate "Japan" by an identifier specific to each country name.

Moreover, when the first element information and the first substrate information indicate "Japan" in representations different from each other, either one of the first element information or the first substrate information may be a string of characters indicating "Japan", and the other may be an image showing the national flag of Japan.

Either one of the first element information or the first substrate information may be a serial number which is a character or a string of characters containing at least either number(s) or letter(s), and the other may be information associated with each serial number.

With such configuration, by using a database relating to an information group containing serial numbers and information associated with each serial number, it is possible to determine whether a combination of the first element information and the first substrate information is authentic, or whether either of the first element information or the first substrate information has been falsified.

Further, the information associated with a serial number may be composed of at least one of letters, numbers, symbols, graphics, given images and the like.

Either one of the first element information or the first substrate information may contain at least one of letters, numbers, symbols, graphics, given images, and the like, and the other may be a cipher associated with information of the former, which may be a cipher indicating that information of the former is authentic. The cipher may be constituted by at least one of letters, numbers, graphics and the like.

With such configuration, by using a database relating to a combination of one piece of information and a cipher associated with each piece of information, it is possible to determine whether a combination of the first element information and the first substrate information is authentic, or either of the first element information or the first substrate information has been falsified.

The device structure 12 may include at least the optical device layer 21 and the information portion 22. For example, if it is possible to form the optical device layer 21 directly on the surface 11S of the substrate 11, and to form the information portion 22 on the surface opposite to the surface on which the surface 11S of the substrate 11 of the optical device layer 21 is in contact, the peeling layer 23 and the adhesive layer 24 can be omitted.

The optical device layer 21 is not limited to the OVD described above, but may be a layer containing other optical devices. The optical device layer may, for example, be an element that reflects light entering the optical device layer, an element that emits light entering the optical device layer as scattered light, and an element that converts color of light entering the optical device layer to a different color and emits the light and the like.

The information portion 22 may be positioned on the side where the substrate 11 is positioned with respect to the optical device layer 21. In this case, the optical device layer 21 may have a characteristic of transmitting laser light. Even with such configuration, as long as the device structure 12 contains the optical device layer 21 and the information portion, it is possible to obtain an equivalent effect to that described above in (1).

In the case where the substrate 11 has a preferable mechanical strength as the personal authentication medium 10, if the substrate 11, for example, has enough thickness so as to obtain an effect equivalent to the mechanical strength obtained by the support substrate 13 and the substrate 11, the support substrate 13 may be omitted.

The personal authentication medium 10 may not have the coating layer 14, and even with such personal authentication medium 10, an equivalent effect to that described above in (1) can be obtained. However, in order to make it difficult to separate the device structure 12 from other elements of the personal authentication medium 10, and in order to suppress damage to the device structure 12, it is preferable that the personal authentication medium 10 have the coating layer 14.

The peeling layer 23 may not have the dispersing portion 23a, and even with such configuration, as long as the device structure 12 includes the optical device layer 21 and the information portion 22, an equivalent effect to that described above in (1) can be obtained.

The anti-counterfeiting structure may be used not only in the personal authentication medium 10 described above, but also in bank notes, securities such as gift certificates, a portion of luxury articles such as artwork. Moreover, alternatively, the anti-counterfeiting structure may be a tag attached to an article to be confirmed as being authentic, or may be a package or a portion of a package accommodating an article to be confirmed as being authentic.

Second Embodiment

Figure 12:
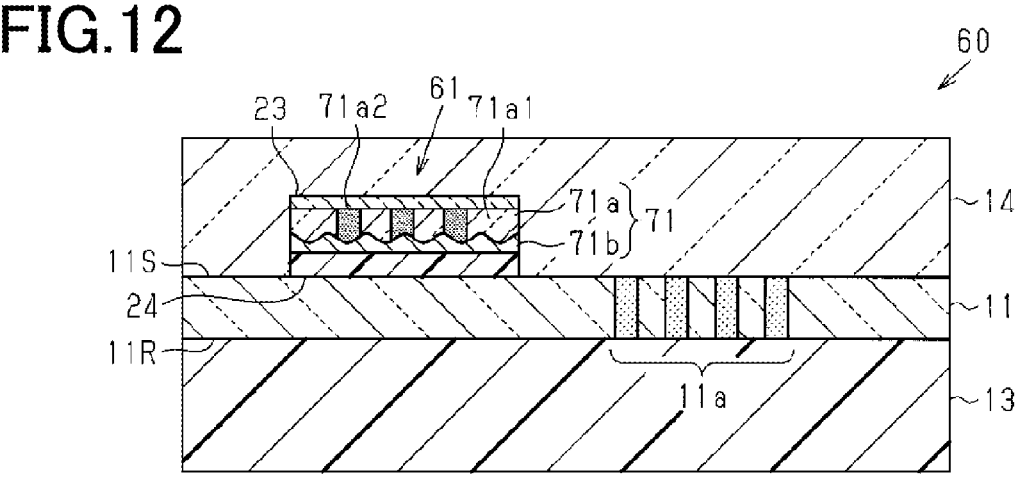
FIG. 12 is a cross-sectional view showing a cross-sectional structure of a second embodiment describing in detail of the anti-counterfeiting structure as the personal authentication medium.
Figure 13:
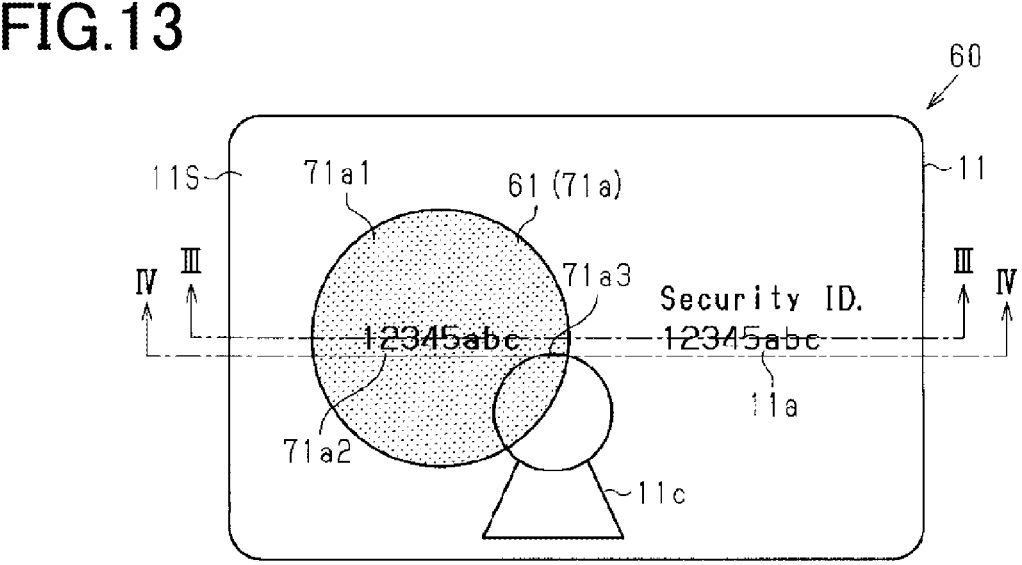
FIG. 13 is a plan view showing a planar structure of the personal authentication medium.
Figure 14:
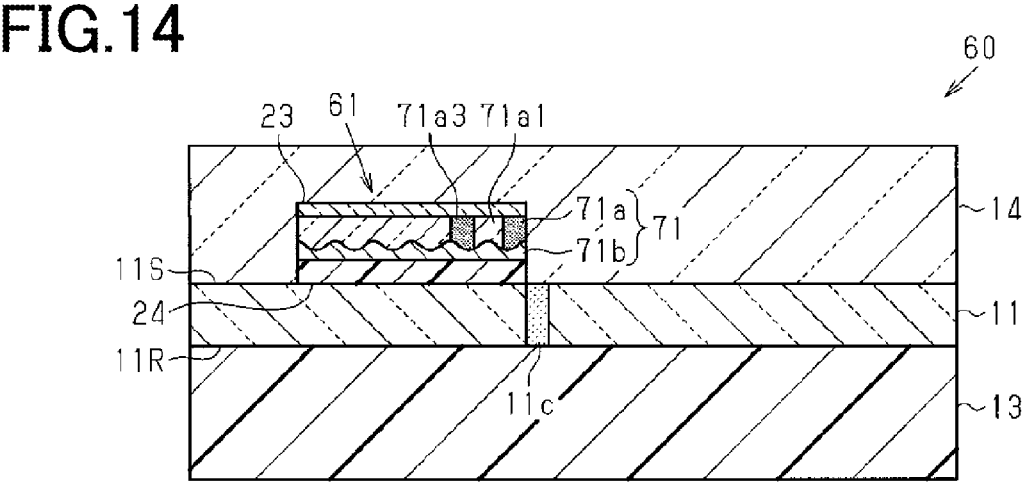
FIG. 14 is a cross-sectional view showing a cross-sectional structure taken along line IV-IV in FIG. 13.

Referring to FIGS. 12 to 14, a second embodiment will be described in detail of the anti-counterfeiting structure as the personal authentication medium. The second embodiment differs from the first embodiment in the configuration of the information portion. Therefore, such difference shall hereinafter be described in detail, and the same reference signs as those in the first embodiment shall be assigned to configurations common to those of the first embodiment, and detailed descriptions thereof shall be omitted. Moreover, configurations of the personal authentication medium and examples will hereinafter be described in sequence.

[Configuration of Personal Authentication Medium]

Referring to FIGS. 12 to 14, the configuration of the personal authentication medium will be described.

As shown in FIG. 12, the personal authentication medium 60 includes a substrate 11, a support substrate 13, and a coating layer 14, as in the personal authentication medium 10 described above. The personal authentication medium 60 includes an device structure 61, and in the device structure 61, a peeling layer 23, an optical device layer 71, and an adhesive layer 24 are stacked in this order.

In the personal authentication medium 60, the optical device layer 71 is an example of an information portion. More specifically, the optical device layer 71 includes a relief structure layer 71a and a reflecting layer 71b, and the relief structure layer 71a contains a first element 71a1 composed of the aforementioned first substance and a plurality of second elements 71a2 containing second substance.

As viewed perpendicular to the surface 11S of the substrate 11, the plurality of second elements 71a2 represent first element information, and each of the second elements 71a2 has a shape representing a portion of the first element information. Each second element 71a2 contains the second substance and the first substance, but may be composed from only the second substance. As viewed perpendicular to the surface 11S of the substrate 11, the first element 71a1 fills spaces between the second elements 71a2 adjacent to one another.

In such personal authentication medium 60, it is not possible to separate the optical device layer 71 from the information portion containing the first element information, and therefore it is possible to make counterfeiting of the personal authentication medium 60 more difficult.

In the device structure 61, the first substance may be composed of the aforementioned near infrared light-absorbing dye and the curable resin, and the second substance may be composed of an alternated substance of the near infrared light-absorbing dye and an alternated substance of the curable resin.

FIG. 13 shows a planar structure of the personal authentication medium 60 as viewed perpendicular to the surface 11S of the substrate 11. Further, in FIG. 13, dots are added to the device structure 61 for convenience of showing schematically diffracted light emitted from the device structure 61. Moreover, in FIG. 13, the illustration of the coating layer 14 and the illustration of the peeling layer 23 are omitted for convenience of explanation. Further, FIG. 12 previously referred to shows a cross-sectional structure taken along the line in FIG. 13.

As shown in FIG. 13, the relief structure layer 71a contains the second element information which is an example of first information, in addition to the aforementioned first element information.

Moreover, the substrate 11 contains a third substance and a fourth substance. The third substance has optical transparency and of being changeable from the third substance to the fourth substance having a designated color by laser irradiation. The fourth substance is an element representing the third substrate information which is an example of the second information, and the third substrate information complements the second element information, thereby, the second element information and the third substrate information constitute one combined set of information. As viewed perpendicular to the surface 11S of the substrate 11, a portion of the second substance representing the second element information and a portion of the fourth substance representing the third substrate information are connected.

The combined information contained in the personal authentication medium 60 straddles the device structure 61 and the substrate 11. Therefore, in order to incorporate the combined information into the personal authentication medium by pasting the device structure 61 containing the second element information on a fraudulent substrate, it is necessary to enhance the accuracy of the position of the second element information with respect to the third substrate information contained in a fraudulent substrate to a comparable level to the accuracy of a genuine personal authentication medium 60. Therefore, counterfeiting of the personal authentication medium 60 can be made difficult.

More specifically, as viewed perpendicular to the surface 11S of the substrate 11, the relief structure layer 71a contains a third element 71a3 at a position different from that of the second device 71a2. Similarly to the second element 71a2, the third element 71a3 may include at least the second substance, for example, the second element 71a2 may contain the first substance and the second substance, but may be composed only of the second substance. The third element 71a3 has a shape representing the second element information as viewed perpendicular to the surface 11S of the substrate 11.

As viewed perpendicular to the surface 11S of the substrate 11, the substrate 11 contains a third substrate information portion 11c in a portion different from that of the first substrate information portion 11a. The third substrate information portion 11c may include at least the fourth substance, for example, the third substrate information portion 11c may contain the third substance and the fourth substance, but may be composed only of the fourth substance. The third substrate information portion 11c has a shape representing the third substrate information as viewed perpendicular to the surface 11S of the substrate 11.

The combined information is an upper body image of the owner of the personal authentication medium 60. The third element 71a3 of the device structure 61 represents a portion of the upper body image, and the third substrate information portion 11c of the substrate 11 represents the remaining portion of the upper body image.

As shown in FIG. 14, the relief structure layer 71a contains the third element 71a3, and a portion of the third element 71a3 contains a periphery of the relief structure layer 71a. The substrate 11 contains the third substrate information portion 11c, and a portion of the third substrate information portion 11c overlaps with the periphery of the relief structure layer 71a in the thickness direction of the device structure 61. In other words, as described above, the third element 71a3 of the relief structure layer 71a and the third substrate information portion 11c of the substrate 11 are connected to each other as viewed perpendicular to the surface 11S of the substrate 11.

EXAMPLES

A transparent polyethylene terephthalate (PET) film having a thickness of 25 μm was prepared as a support layer, and an ink for a peeling layer having the following composition was applied on one surface of the support layer. Then, the coating liquid was dried at 120° C. for 45 seconds to form a peeling layer having a thickness of 1 μm.

Next, an ink for a relief structure layer having the following composition was applied and the coating liquid was dried at 120° C. for 45 seconds to form a precursor layer having a thickness of 3 μm on the peeling layer. Then, a relief surface having a relief pattern was formed by a roll embossing method on the surface opposite to the surface on which the peeling layer of the precursor layer is in contact. Thereby, a relief structure layer of the optical device layer was obtained.

A zinc sulfide layer having a thickness of 1,000 Å was formed as a reflecting layer on the relief surface by a vacuum deposition method. Then, an adhesive layer was formed by applying an ink for an adhesive layer having the following composition so that the thickness after drying would be 2 μm. Thereby, a transfer foil for forming an device structure was obtained.

| [Ink for peeling layer] | |
|---|---|
| Polyamide-imide resin | 40 parts |
| Dimethylacetamide | 30 parts |
| Tetrahydrofuran | 30 parts |
| [Ink for relief structure layer] | |
| Laser coloring ink (Elbima Z117) | 22 parts |
| UV curable acrylic resin | 75 parts |
| Irgacure 184 | 3 parts |
| [Ink for adhesive layer] | |
| Polyurethane resin | 30 parts |
| Methyl ethyl ketone | 70 parts |

An device structure was transferred to a 100-μm-thick substrate (Makrofol ID4-4 laserable, manufactured by Bayer Corporation) using a hot stamp. The temperature of the plate surface, which is the surface in contact with the transfer foil, of the hot stamp was set at 131° C., and the pressure at which the hot stamp presses the transfer foil against the substrate was set at 1.2 t. Then, the support layer was peeled off from the transfer foil.

A 400-μm-thick support substrate and a 125-μm-thick coating layer (Makrofol ID 6-2_000000 manufactured by Bayer) were prepared, and were laminated by sandwiching the substrate having the device structure between the support substrate and the coating layer. These layers were laminated by use of a hydraulic molding machine for 3 minutes where the temperature was set at 190° C., and the pressure was set at 100 kgf/cm². Then, the temperature was set at 25° C., and the pressure was set at 100 kgf/cm² and lamination was performed for 3 minutes. Thus, a laminate was obtained.

The laminate was laser-irradiated by use of a YVO4 laser (MD-V9600A manufactured by Keyence Corporation), and a personal authentication medium containing the first element information, the first substrate information, and the combined information was obtained.

The device structure was taken out from the personal authentication medium by peeling off the coating layer from the substrate, but it was not possible to separate the optical device layer contained in the device structure from the second element of the relief structure layer. Accordingly, it was not possible to add information other than the first information represented by the second element of the relief structure to the device structure. Therefore, according to the personal authentication medium of the examples, it was recognized that it is difficult to counterfeit the personal authentication medium.

As described above, according to the second embodiment of the anti-counterfeiting structure, the following effects can be obtained.

(4) Since it is impossible to separate the optical device layer 71 from the information portion, it is possible to make counterfeiting of the personal authentication medium 60 more difficult.

(5) Since the combined information contained in the personal authentication medium 60 straddles the device structure 61 and the substrate 11, in order to incorporate the combined information into the personal authentication medium by attaching the device structure 61 containing the second element information to the fraudulent substrate, it is necessary to enhance the accuracy of the position of the second element information with respect to the third substrate information contained in a falsified substrate to a comparable level to the accuracy of the genuine personal authentication medium 60. Therefore, counterfeiting of the personal authentication medium 60 can be made difficult.

[Modification of the Second Embodiment]

The second embodiment described above may be appropriately modified as below.

An information portion may be contained in a portion of the relief structure layer 71a. Namely, a portion of the relief structure layer 71a is formed of the first substance and the second substance, whereas other portions may be formed of a material which is different from the first substance, and whose characteristics prior to laser irradiation are not different from the characteristics after laser irradiation. As long as the relief structure layer 71a contains the information portion, it is possible to obtain an equivalent effect to that described above in (4).

The optical device layer 71 is not limited to a relief diffraction grating layer, and may be a layer containing another optical device. Even with such configuration, as long as the optical device layer contains the information portion, it is possible to obtain an equivalent effect to that described above in (4).

The combined information is not limited to the upper body image, and may be, for example, at least one piece of the aforementioned biometric information or at least one piece of the non-biometric information.

Third Embodiment

Figure 15:
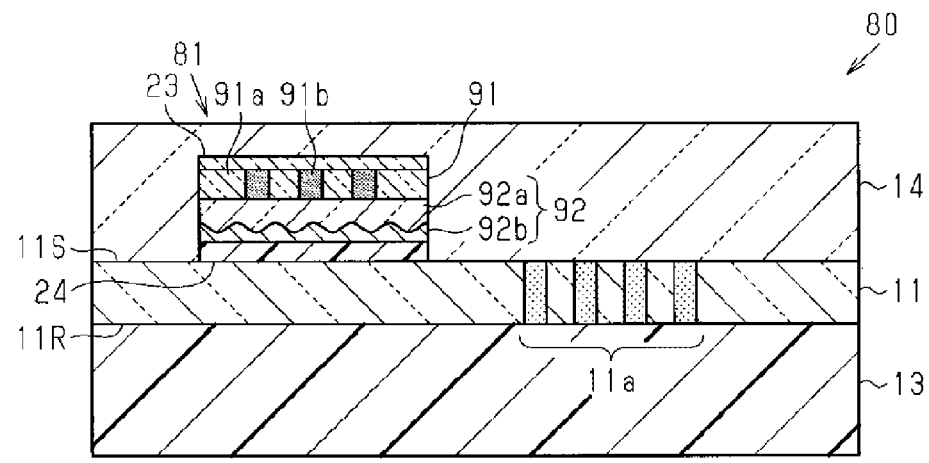
FIG. 15 is a cross-sectional view showing a cross-sectional structure of a third embodiment describing in detail of the anti-counterfeiting structure as the personal authentication medium.

Referring to FIG. 15, a third embodiment will be described in detail of the anti-counterfeiting structure as the personal authentication medium. The third embodiment has a different configuration of an information portion from the second embodiment. Therefore, the following description refers to such a difference in detail, and omits detailed description of configuration that is common to the configuration of the second embodiment by reference to the configuration with identical reference signs.

[Configuration of Personal Authentication Medium]

Referring to FIG. 15, the configuration of the personal authentication medium will be described.

As shown in FIG. 15, a personal authentication medium 80 includes a substrate 11, a support substrate 13, and a coating layer 14, as in the personal authentication medium 60 described above. The personal authentication medium 80 includes an device structure 81, and in the device structure 81, a peeling layer 23, an information layer 91, an optical device layer 92, and an adhesive layer 24 are stacked in this order. The optical device layer 92 includes a relief structure layer 92a and a reflecting layer 92b.

In the personal authentication medium 80, an information portion containing first element information is the information portion 91 having a layer form containing a first substance and a second substance. The information layer 91 is positioned on the side opposite to the side on which the substrate 11 is positioned with respect to the optical device layer 92, and overlaps with the optical device layer 92 as viewed perpendicular to the surface 11S of the substrate 11.

The information layer 91 contains a first element 91a composed of the aforementioned first substance, and a plurality of second elements 91b containing a second substance. As viewed perpendicular to the surface 11S of the substrate 11, each second element 91b has a shape that represents a portion of the first element information. Each of the second elements 91b contains the second substance and the first substance, but may be composed from only the second substance. As viewed perpendicular to the surface 11S of the substrate 11, the first element 91a fills the space between the second elements 91b adjacent to one another.

In the case the optical device layer 92 contains an information portion, the information portion is required to be formed of a material which does not impair the formation of the optical device layer 92 and the function of the optical device layer 92. In this respect, according to the device structure 81 of the personal authentication medium 80, since the information layer 91 is a layer different from the optical device layer 92, the selectability of a material constituting the information layer 91 increases.

As described above, according to the third embodiment of the anti-counterfeiting structure, the effect described below can be obtained.

(6) Since the information layer 91 is a layer different from the optical device layer 92, the selectability of a material constituting the information layer 91 increases.

[Modification of the Third Embodiment]

Further, the third embodiment described above may be appropriately modified as below.

The peeling layer 23 may be an example of an information layer. Namely, the peeling layer 23 may contain the first element composed of the aforementioned first substance, and a plurality of second elements containing the second substance. Further, each of the second elements may have a shape representing a portion of the first element information as viewed perpendicular to the surface 11S of the substrate 11. Even with such configuration, since the peeling layer 23 which is an example of the information layer and the optical device layer 92 are different layers, it is possible to obtain an equivalent effect to that described above in (6).

The adhesive layer 24 may be an example of an information layer. Namely, the adhesive layer may contain a first element composed of the aforementioned first substance, and a plurality of second elements containing a second substance. Further, each of the second elements may have a shape representing a portion of the first element information as viewed perpendicular to the surface 11S of the substrate 11. In this case, the optical device layer 92 may have a characteristic of transmitting laser light. Even with such configuration, since the adhesive layer 24 which is an example of an information layer and the optical device layer 92 are different layers, it is possible to obtain an equivalent effect to that described above in (6).

What is claimed is:

1. An anti-counterfeiting structure, comprising:
a substrate having a first surface and a second surface, which is opposite to the first surface; and,
a support substrate in contact with the first surface of the substrate;
a device structure on a first portion of the second surface of the substrate;
a coating layer covering the device structure and a second portion of the second surface of the substrate, wherein the second portion is a portion of the second surface of the substrate other than the first portion of the second surface of the substrate;
wherein a side opposite to the side on which the substrate is positioned with respect to the device structure is an observation side;
wherein the device structure comprises:
a peeling layer, an optical device layer, and an adhesive layer, stacked in this order and adjacent to each other, wherein the optical device layer diffracts predetermined light towards the observation side, the optical device layer comprises a relief structure layer and a reflecting layer, the relief structure layer contains a first element composed of a first substance and a plurality of second elements containing a second substance, the plurality of second elements represent first element information, the first element and each of the second elements extend through an entire thickness of the relief structure layer between the reflective layer and the peeling layer.

2. The anti-counterfeiting structure of claim 1, wherein the relief structure layer comprises a polymer material and the reflecting layer comprises a high refractive index material or a metal material.

3. The anti-counterfeiting structure of claim 2, wherein the reflecting layer comprises a high refractive index material selected from $MgO_2$, $TiO_2$, $Si_2O_3$, SiO, $Fe_2O_3$, and ZnS.

4. The anti-counterfeiting structure of claim 1, wherein the peeling layer comprises an optically transparent, heat-resistant thermoplastic resin selected from a polyetherimide resin, a polyamideimide resin, and a polyimide resin.

5. The anti-counterfeiting structure of claim 4, wherein the thermoplastic resin is a polyamideimide resin.

6. The anti-counterfeiting structure of claim 1, wherein an adhesive strength between the coating layer and the device structure is lower than an adhesive strength between each pair of individual layers of the device structure.

7. The anti-counterfeiting structure of claim 1, wherein the device structure consists of the peeling layer, the relief structure layer, the reflecting layer and the adhesive layer stacked in this order, wherein the adhesive layer is in direct contact with the second surface of the substrate.

8. The anti-counterfeiting structure of claim 1, wherein each the first substance and the second substance has fluorescence properties.

* * * * *